(12) United States Patent
Altenburger

(10) Patent No.: US 11,575,176 B2
(45) Date of Patent: Feb. 7, 2023

(54) BATTERY PACK

(71) Applicant: TECHTRONIC CORDLESS GP, Anderson, SC (US)

(72) Inventor: Ryan Altenburger, Greenville, SC (US)

(73) Assignee: Techtronic Cordlesss GP, Anderson, SC (US)

( * ) Notice: Subject to any disclaimer, the term of this patent is extended or adjusted under 35 U.S.C. 154(b) by 135 days.

(21) Appl. No.: 16/536,418

(22) Filed: Aug. 9, 2019

(65) Prior Publication Data

US 2021/0043891 A1 Feb. 11, 2021

(51) Int. Cl.
*H01M 50/213* (2021.01)
*B25F 5/02* (2006.01)
*H02J 7/00* (2006.01)

(52) U.S. Cl.
CPC ............. *H01M 50/213* (2021.01); *B25F 5/02* (2013.01); *H02J 7/0044* (2013.01); *H01M 2220/30* (2013.01)

(58) Field of Classification Search
CPC ... H01M 50/213; H01M 2220/30; B25F 5/02; H02J 7/0044
See application file for complete search history.

(56) References Cited

U.S. PATENT DOCUMENTS

| | | |
|---|---|---|
| 7,429,430 B2 | 9/2008 | Mooty et al. |
| 7,441,813 B2 | 10/2008 | Qin et al. |
| 7,539,521 B2 | 5/2009 | Nam |
| 7,629,074 B2 | 12/2009 | Li et al. |
| 7,789,439 B2 | 9/2010 | Zhao et al. |
| 7,892,668 B2 | 2/2011 | Choi |
| 8,241,777 B2 | 8/2012 | Dong et al. |
| 8,580,416 B2 | 11/2013 | Cao |
| 8,586,225 B1 | 11/2013 | Bausch et al. |
| 9,123,934 B2 | 9/2015 | Liang et al. |
| 2005/0130029 A1 | 6/2005 | Kim |
| 2006/0172183 A1 | 8/2006 | Chen et al. |

(Continued)

FOREIGN PATENT DOCUMENTS

| | | |
|---|---|---|
| CN | 101028710 A | 9/2007 |
| CN | 100391113 C | 5/2008 |

(Continued)

OTHER PUBLICATIONS

European Patent Office Extended Search Report for Application No. 20190314.3 dated Nov. 10, 2020 (9 pages).

*Primary Examiner* — Michael L Dignan
(74) *Attorney, Agent, or Firm* — Michael Best & Friedrich LLP

(57) ABSTRACT

A battery pack including a housing having a first end, a second end, and a longitudinal axis that extends between the first end and the second end, electrical terminals positioned within the housing and configured to engage and electrically couple with electrical terminals of a power tool, and a latch mechanism including an actuator and a latch member that is spaced apart from the actuator. The actuator has a distal end that is positioned adjacent the first end of the housing, a proximal end that is spaced apart from the distal end, and an actuating surface that extends between the distal end and the proximal end. The actuating surface has a gradually decreasing slope between the distal end and the proximal end.

20 Claims, 7 Drawing Sheets

(56) References Cited

U.S. PATENT DOCUMENTS

| | | |
|---|---|---|
| 2006/0199072 A1 | 9/2006 | Lui et al. |
| 2007/0026298 A1 | 2/2007 | Chen |
| 2007/0091556 A1 | 4/2007 | Wu |
| 2007/0277987 A1 | 12/2007 | Meyer et al. |
| 2009/0246608 A1* | 10/2009 | Wu .................... H01M 50/213 429/100 |
| 2010/0151305 A1 | 6/2010 | Ouyang |
| 2011/0133496 A1* | 6/2011 | Cooper .................... B25F 5/02 292/341.15 |
| 2013/0008682 A1* | 1/2013 | Turner .................. H01M 50/20 173/217 |
| 2014/0349143 A1* | 11/2014 | Ogura .............. H01M 10/6235 429/7 |
| 2015/0263592 A1 | 9/2015 | Kawakami et al. |
| 2015/0367497 A1* | 12/2015 | Ito .............................. B25F 5/02 173/217 |
| 2016/0240901 A1* | 8/2016 | Kondo ................ H01M 50/213 |
| 2016/0293912 A1 | 10/2016 | Manion et al. |
| 2018/0040927 A1* | 2/2018 | Rejman ................ H01M 10/482 |
| 2020/0052257 A1* | 2/2020 | Stanton ................. H01M 50/24 |

FOREIGN PATENT DOCUMENTS

| | | |
|---|---|---|
| CN | 201112450 Y | 9/2008 |
| CN | 102832649 A | 12/2012 |
| CN | 202702206 U | 1/2013 |
| CN | 104242406 B | 12/2014 |
| CN | 204068393 U | 12/2014 |
| CN | 105196259 A | 12/2015 |
| CN | 205645917 U | 10/2016 |
| CN | 108389990 A | 8/2018 |
| CN | 208127272 U | 11/2018 |
| DE | 102008019068 A1 | 10/2009 |
| DE | 112013006567 T5 | 10/2015 |
| DE | 102016203422 A1 | 9/2016 |
| EP | 2329921 A1 | 6/2011 |
| EP | 3441193 A1 | 2/2019 |
| JP | 2012099383 A | 5/2012 |

* cited by examiner

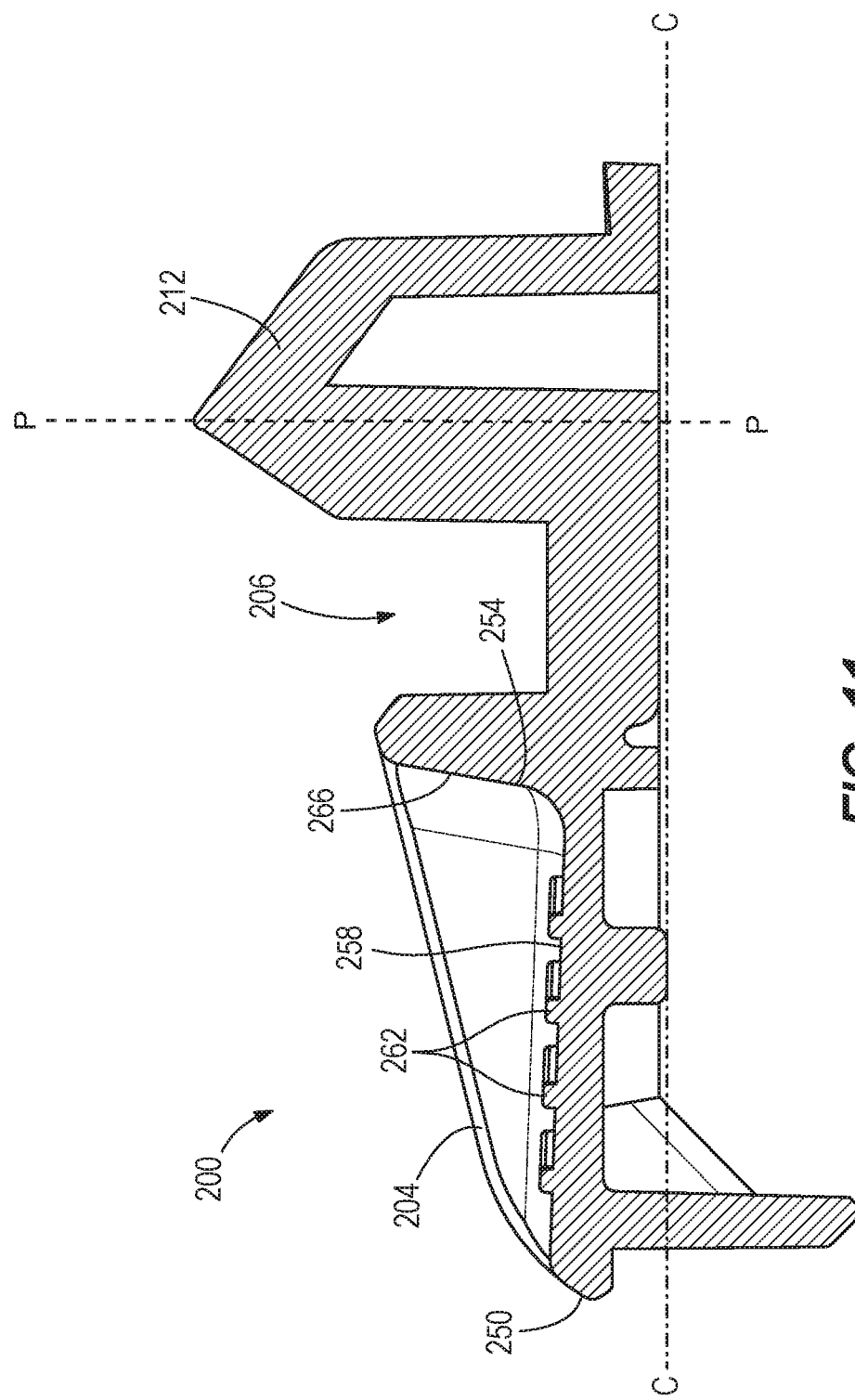

ize 1

BATTERY PACK

BACKGROUND

The present invention relates to a battery pack.

SUMMARY

In one embodiment, the disclosure provides a battery pack including a housing having a first end, a second end, and a longitudinal axis that extends between the first end and the second end, electrical terminals positioned within the housing and configured to engage and electrically couple with electrical terminals of a power tool, and a latch mechanism including an actuator and a latch member that is spaced apart from the actuator. The actuator has a distal end that is positioned adjacent the first end of the housing, a proximal end that is spaced apart from the distal end, and an actuating surface that extends between the distal end and the proximal end. The actuating surface has a gradually decreasing slope between the distal end and the proximal end.

In another embodiment, the disclosure provides a power tool including a housing having a handle configured to be grasped by a user and a battery receiving portion having electrical terminals, the battery receiving portion having a longitudinal axis, a motor supported by the housing, a tool element coupled to the motor, and a battery pack coupleable to the battery receiving portion of the housing of the power tool. The battery pack includes a housing having a first end, a second end, and a longitudinal axis that extends between the first end and the second end, electrical terminals positioned within the housing and configured to engage and electrically couple with electrical terminals of a power tool, and a latch mechanism including an actuator and a latch member that is spaced apart from the actuator and receivable within a recess in the battery receiving portion. The actuator has a distal end that is positioned adjacent the first end of the housing, a proximal end that is spaced apart from the distal end, and an actuating surface that extends between the distal end and the proximal end. The actuating surface has a gradually decreasing slope between the distal end and the proximal end.

In another embodiment, the disclosure provides a battery pack including a housing having a longitudinal axis, a first surface, and a second surface, electrical terminals positioned within the housing and configured to engage and electrically couple with electrical terminals of a power tool, and a latch mechanism including an actuator that is movable within an aperture in the first surface and a latch member movable within an aperture in the second surface. The actuator includes an actuating surface that slopes inwardly and downwardly relative to the housing of the battery pack.

Other aspects of the invention will become apparent by consideration of the detailed description and accompanying drawings.

BRIEF DESCRIPTION OF THE DRAWINGS

FIG. 11 is a cross-sectional view of the latch of FIG. 1 along a longitudinal axis of the latch.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
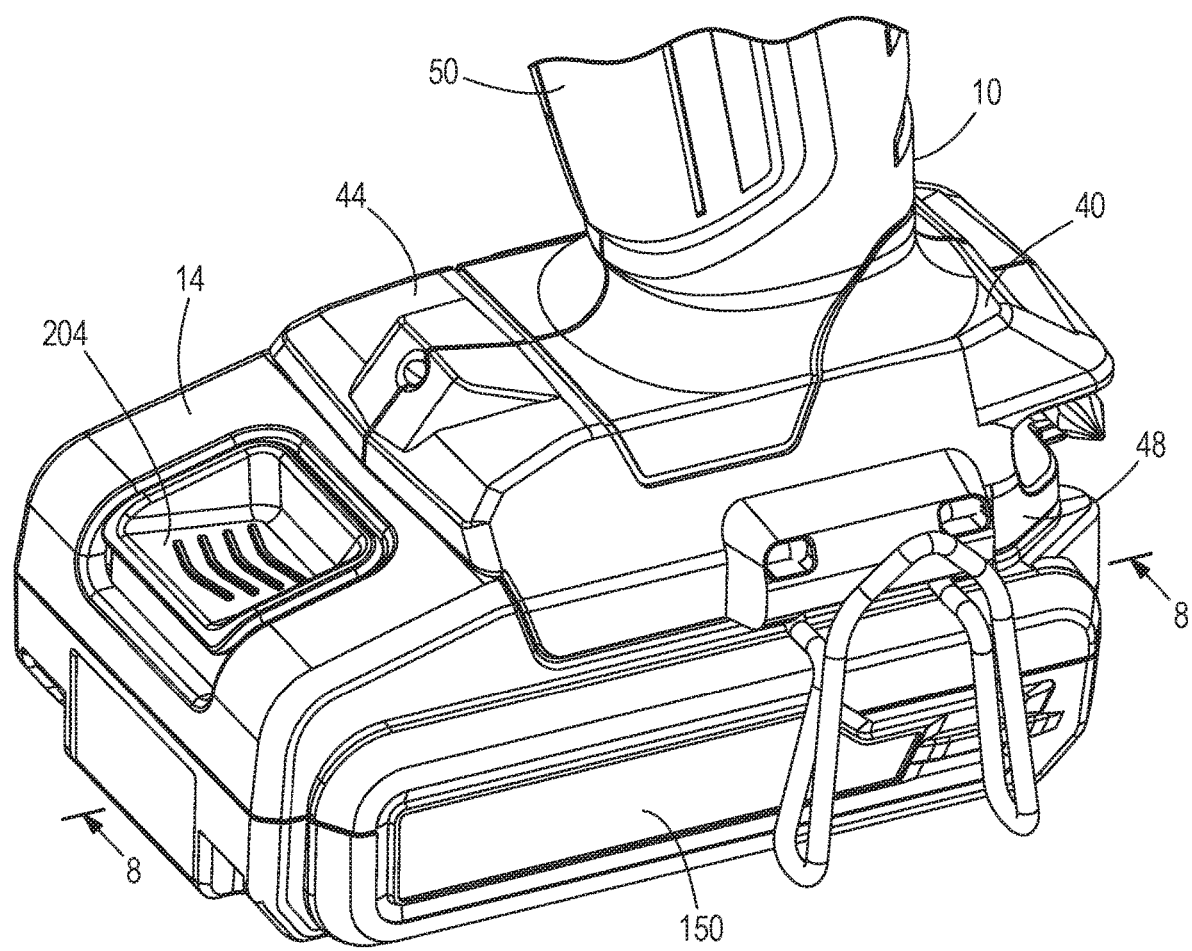
FIG. 1 is a perspective view of a power tool and a battery pack attached thereto.
Figure 2:
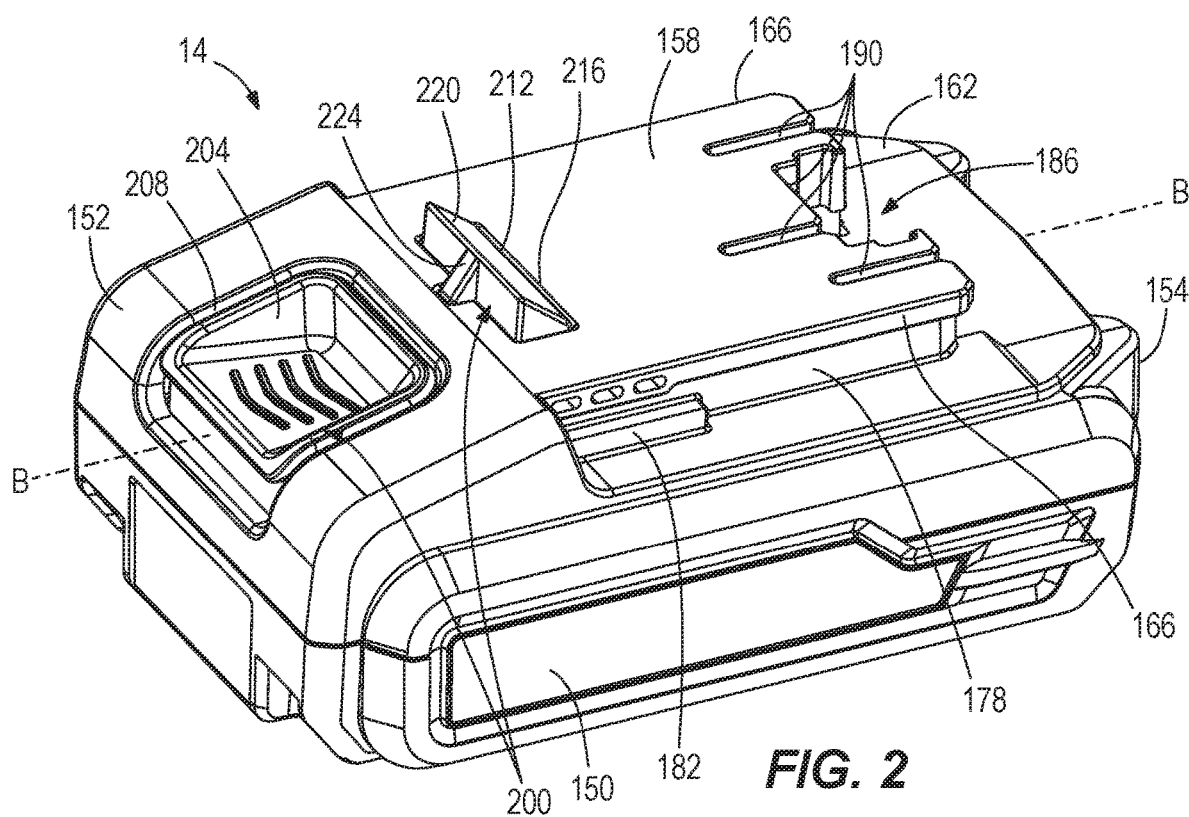
FIG. 2 is a perspective view of the battery pack of FIG. 1.
Figure 3:
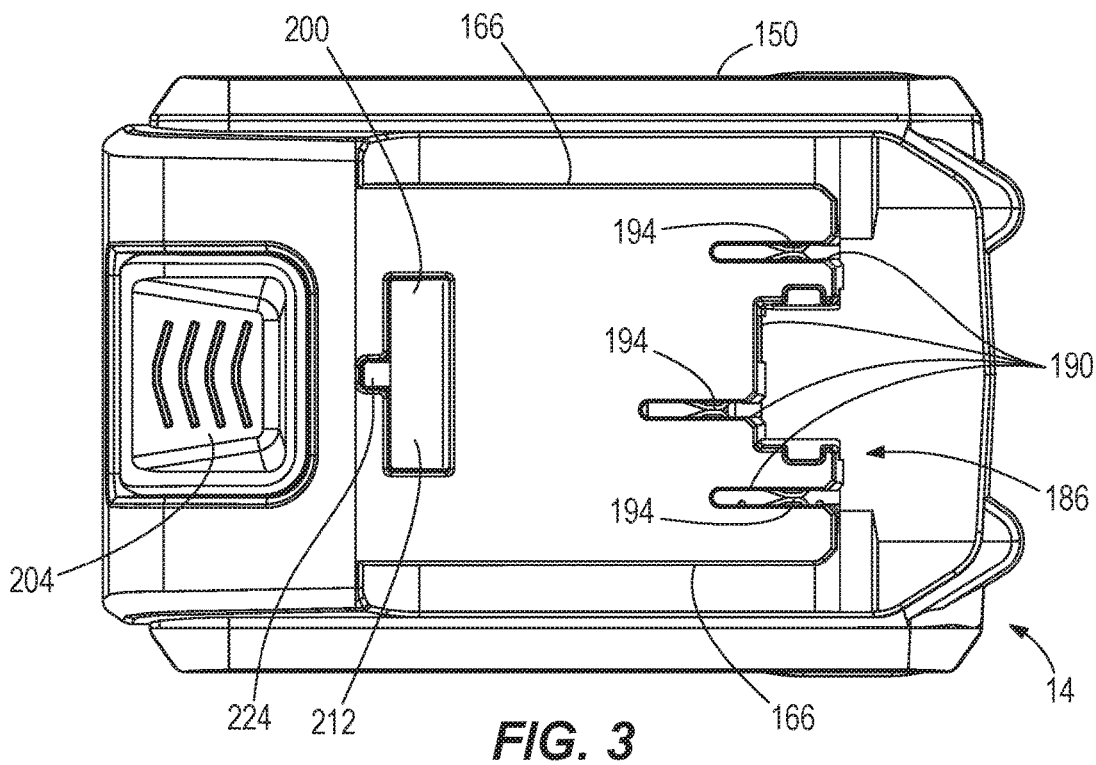
FIG. 3 is a top view of the battery pack of FIG. 1.
Figure 4:
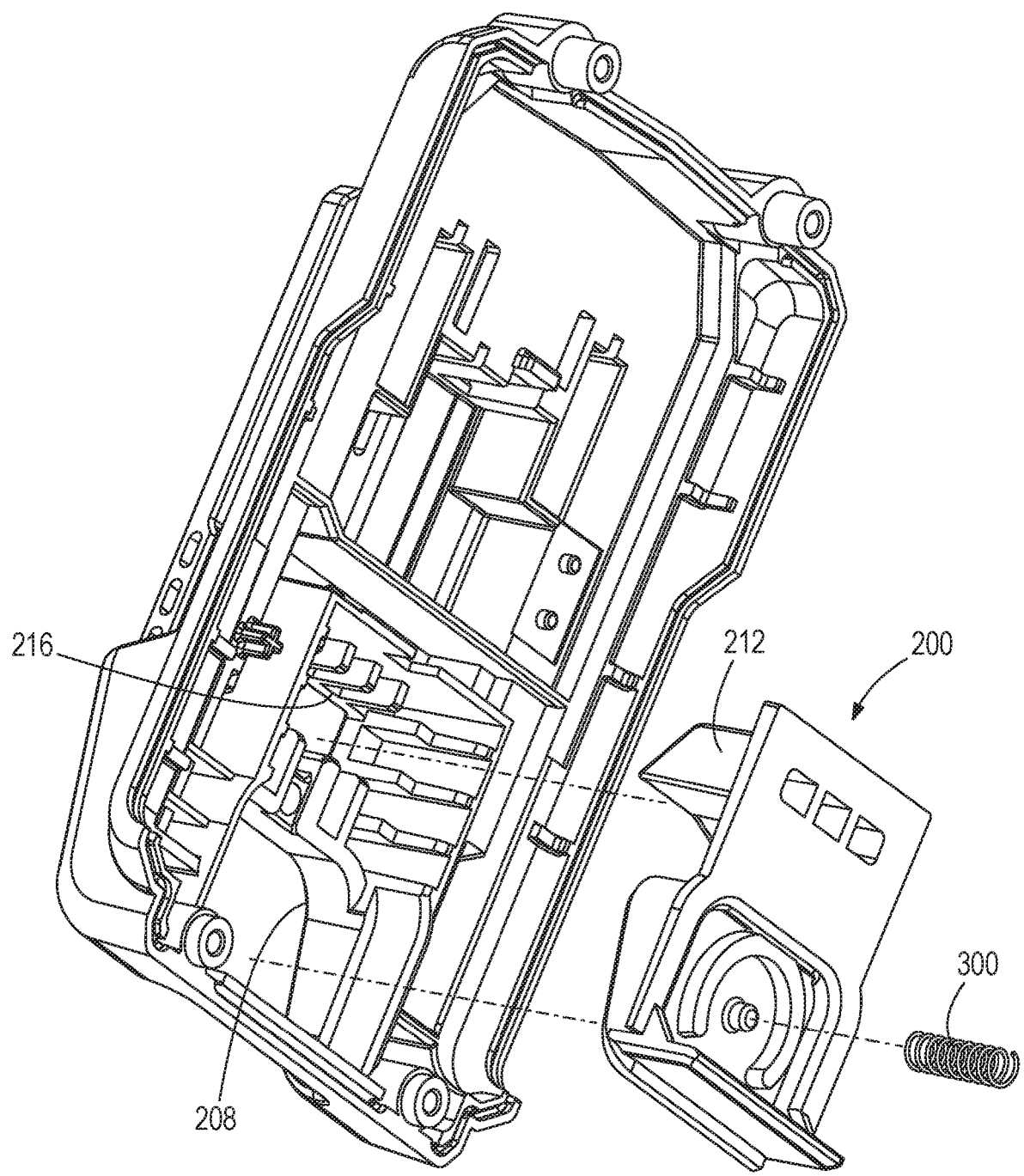
FIG. 4 is an exploded view of a portion of the battery pack of FIG. 1.

FIG. 1 illustrates a power tool 10 and a slidable-type battery pack 14 that is removably and electronically coupled to the power tool 10. The power tool 10 includes a housing 40. As shown in FIG. 1, the housing 40 has a first housing portion 44 that is coupled to a second housing portion 48. Each housing portion 44, 48 is formed of plastic; however, in some embodiments, the housing portions 44, 48 may be formed of other materials. The housing 40 defines a handle 50, which is connected to gear case housing portion (not shown). The handle 50 includes at least one grip surface configured to be grasped by a user.

Figure 5:
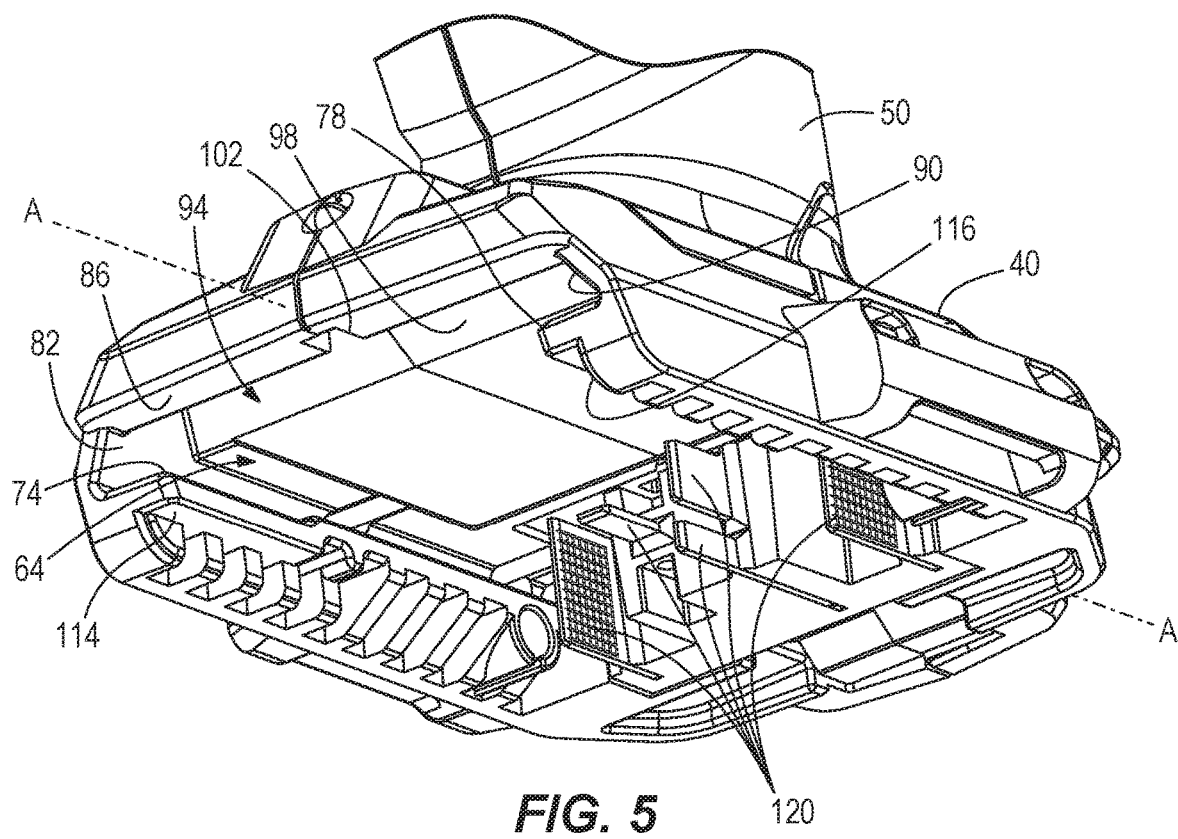
FIG. 5 is a bottom perspective view of the power tool of FIG. 1.
Figure 6:
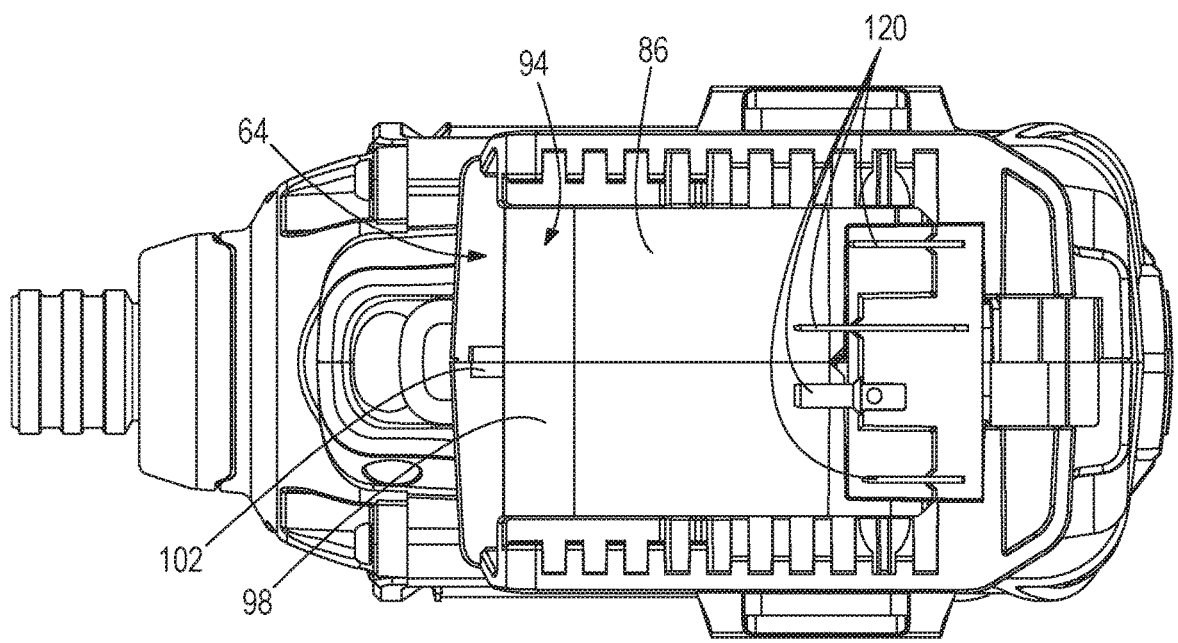
FIG. 6 is a bottom view of the power tool of FIG. 1.
Figure 7:
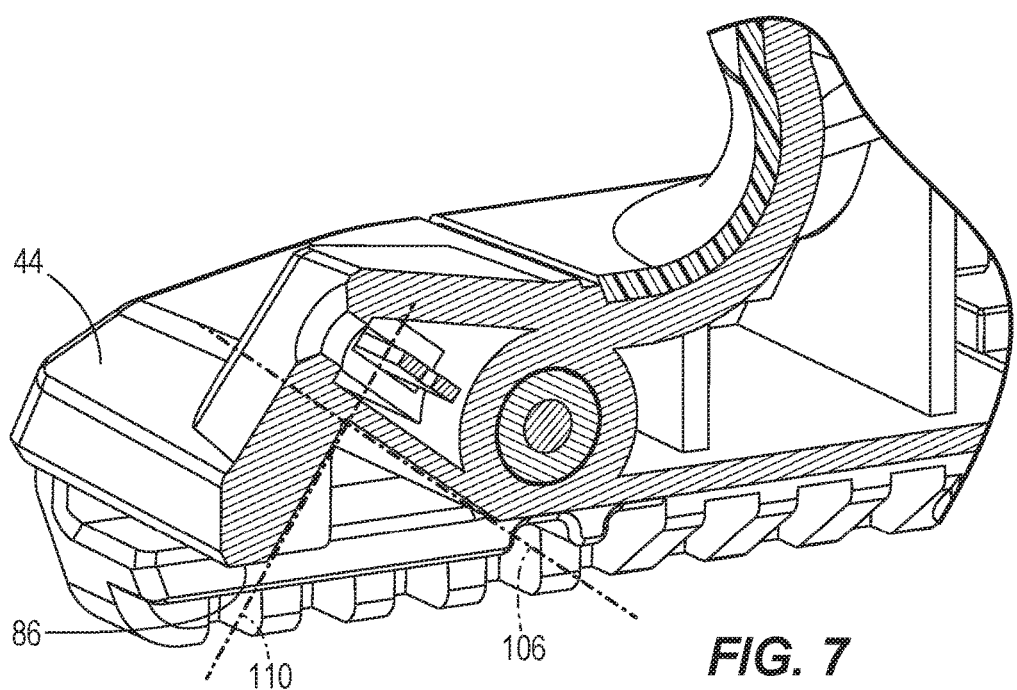
FIG. 7 is a cross-sectional view of portion of the power tool of FIG. 1 along a longitudinal axis of the power tool.
Figure 8:
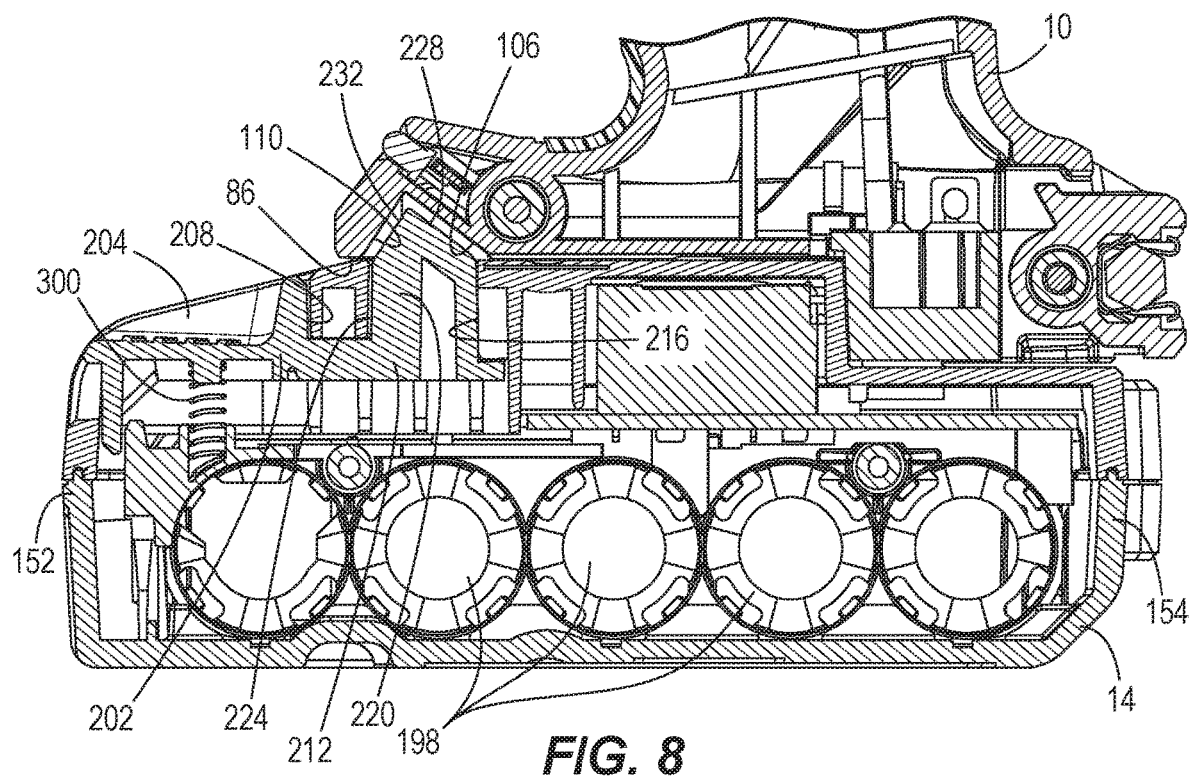
FIG. 8 is a cross-sectional view of the power tool and battery pack of FIG. 1 along longitudinal axes of the power tool and battery pack.

In the illustrated embodiment, the handle 50 can also define a battery receiving portion 64 (FIGS. 5-7) for receiving the battery pack 14. The battery receiving portion 64 defines a longitudinal axis A. A first rail 74 and a second rail 78 extend along opposite sides of the battery pack receiving portion 64. A first channel 82 is defined between the first rail 74 and a surface 86 of the battery receiving portion 64, and a second channel 90 is defined between the second rail 78 and the surface 86 of the battery receiving portion 64. The surface 86 includes a recess 94 having a first recess portion 98 and a second recess portion 102. The first recess portion 98 includes a first inclined surface 106, and the second recess portion 102 includes a second inclined surface 110 (FIGS. 7-8). The first recess portion 98 has at least one dimension that is greater than a dimension of the second latch portion 102. For example, the first latch portion 98 is wider than the second latch portion 102. Also, the inclined surface 106 has a length that is longer than a length of an inclined surface 110. The first inclined surface 106 is oriented at an angle that ranges from 35 degrees to 38 degrees relative to the longitudinal axis A, and the second inclined surface 110 is oriented at an angle that ranges from 55 degrees to 58 degrees relative to the longitudinal axis A. In the illustrated embodiment, the first inclined surface 106 is oriented at angle of approximately 36.5 degrees relative to the longitudinal axis A and the second inclined surface 110 is oriented at an angle of approximately 56.4 degrees relative to the longitudinal axis A. Approximately, as used herein, means plus or minus two degrees. Moreover, the first and second inclined surfaces 106, 110 are oriented at an angle ranging from 85 degrees to 89 degrees relative to one another. In the illustrated embodiment, the first and second inclined surfaces 106, 110 are oriented at an angle of approximately 87 degrees relative to on one another. First and second recesses or slots 114, 116 also extend along opposite sides of the battery receiving portion 64. Electrical terminals 120 are positioned within the battery receiving portion 64.

FIGS. 1-4 and 8 show the battery pack 14 in greater detail. The battery pack 14 includes a housing 150 having a longitudinal axis B that extends between a first end 152 and a second end 154, as well as an interface this is physically coupleable to the complementary interface (FIGS. 5-7) of the power tool 10 or a charger (not shown). The interface includes a first surface (e.g., top surface) 158 and a second surface (e.g., intermediate surface) 162. Although only one of each is shown, a pair rails 166, a pair of channels 178, and a pair of projections 182 extend along opposite sides of the interface parallel to the longitudinal axis B. In particular, the channels 178 are defined between the respective rails 166 and the intermediate surface 162, and the projections 182 are positioned within the channels 178 between the respective rails 166 and the intermediate surface 162.

A terminal block 186 extends between the top surface 158 and the intermediate surface 162. The terminal block 186 includes openings 190. Electric terminals 194 are positioned within the housing 150 and configured to engage the electrical terminals 120 of the power tool 10 for the battery pack 14 to electrically power the power tool 10. In particular, each of the electrical terminals 194 of the battery pack 14 is aligned with one of the openings 190 of the terminal block 186, and when coupled to the power tool 10, each of the electrical terminals 120 of the power tool 10 extends into the openings 190 to engage the electrical terminals 194 of the battery pack 14. In the illustrated embodiment, the electrical terminals 120 of the power tool are male terminals and the electrical terminals 194 of the battery pack are female terminals. In other or additional embodiments, the electrical terminals 120 of the power tool may be female terminals and the electrical terminals 194 of the battery pack may be male terminals.

With reference to FIG. 8, the battery pack housing 40 encloses an inner cavity that includes the components of the battery pack 10 including battery cells 198, a battery controller, and internal frames that receive and constrain the battery cells. Only the battery cells 198 are shown. The electrical terminals are electrically coupled to the battery cells and controller.

With renewed reference to FIGS. 2-3 and 8-11 the battery pack 14 includes a latch mechanism 200 according to one embodiment of the invention. In the illustrated embodiment, the latch mechanism 200 includes body 202 that has a longitudinal axis C and a flange 203 that extends at least partially from a perimeter of the body 202. When the battery pack 14 is coupled to the power tool 10, the longitudinal axes A and C are parallel to one another. The latch mechanism 200 further includes an actuator 204 (i.e., button) and a latch member 212 that are positioned on opposite ends of the body 202 and are separated by a gap 206. The actuator 204 is movable within a first aperture 208 in the housing 150 and a latch member 212 that is moveable through a second aperture 216 in the housing 150.

Figure 9:
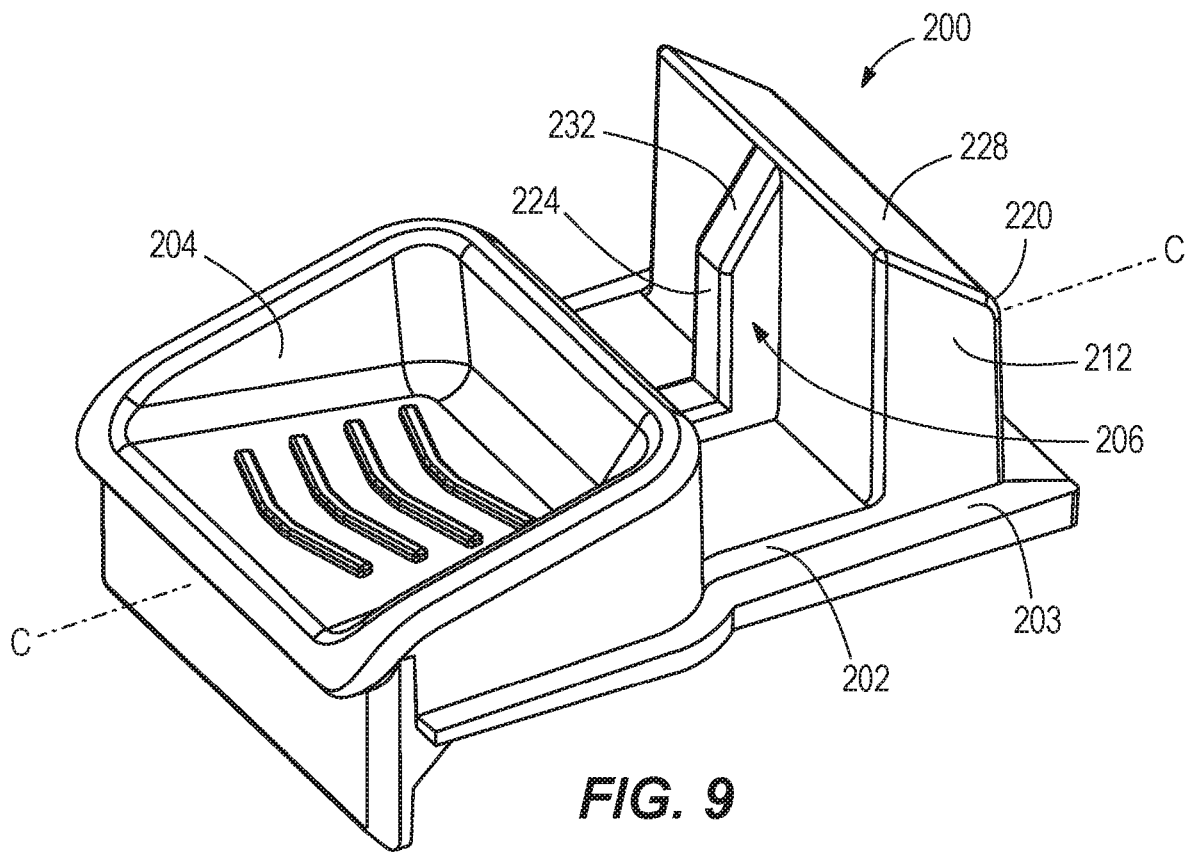
FIG. 9 is a perspective view of a latch of the battery pack of FIG. 1.
Figure 10:
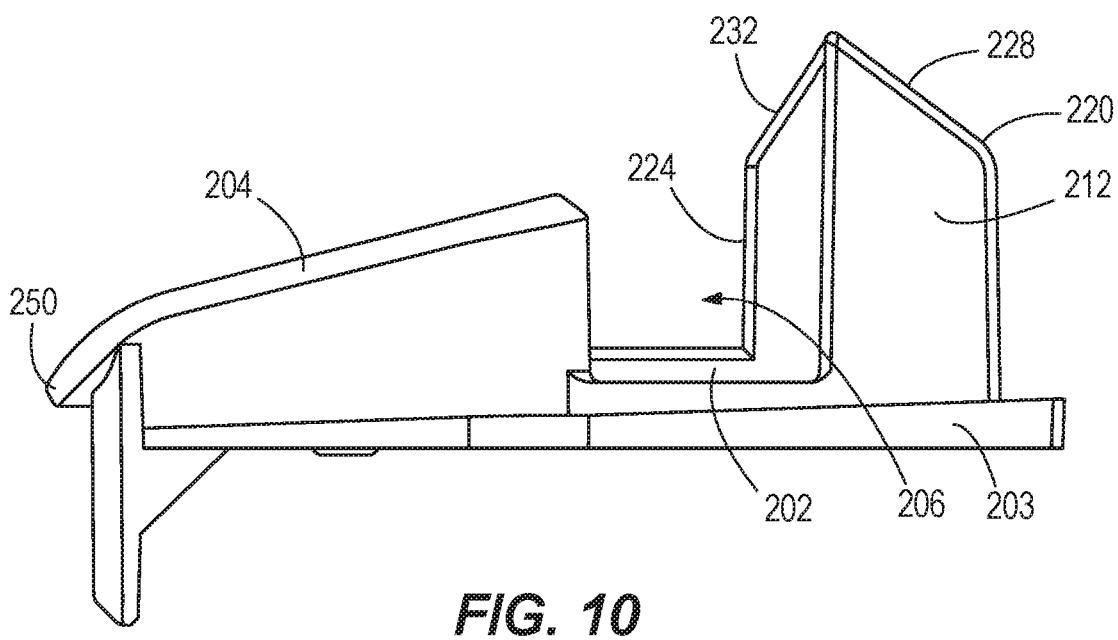
FIG. 10 is a side view of a latch of the battery pack of FIG. 1.

Further with respect to FIGS. 8-10, the latch member 212 includes a first latch portion 220 and a second latch portion 224. The first latch portion 220 includes a first inclined surface 228, and the second latch portion 224 includes a second inclined surface 232. The first latch portion 220 has at least one dimension that is greater than a dimension of the second latch portion 224. For example, the first latch portion 220 is wider than the second latch portion 224. Also, the first inclined surface 228 of the first latch portion 220 has a length that is longer than a length of the second inclined surface 232 of the second latch portion 224. The first and second latch portions 220, 224 are configured to be received respectively within the first and second recess portions 98, 102 of the power tool housing 40. Accordingly, the first and second inclined surfaces 228, 232 of the first and second latch portions 220, 224 are the same or similar (e.g., complementary to) to the first and second inclined surfaces 106, 110 of the first and second recess portion 98, 102 That is, the first inclined surface 228 is oriented at an angle that ranges from 35 degrees to 39 degrees relative to the longitudinal axis C, and the second inclined surface 232 is oriented at an angle that ranges from 58 degrees to 62 degrees relative to the longitudinal axis C. In the illustrated embodiment, the first inclined surface 228 is oriented at angle of approximately 37 degrees relative to the longitudinal axis C and the second inclined surface 232 is oriented at an angle of approximately 60 degrees relative to the longitudinal axis C. Moreover, the first and second inclined surfaces 228, 232 intersect one another and are oriented at an angle ranging from 81 degrees to 85 degrees relative to one another. In the illustrated embodiment, the first and second inclined surfaces 228, 232 are oriented at an angle of approximately 83 degrees relative to on one another. As shown in FIG. 11, the first and second inclined surface 228, 232 intersect at a common plane P, which is perpendicular to the longitudinal axis C. Accordingly, the first and second inclined surfaces 228, 232 extend (e.g., slope) in opposite directions from the plane P towards the longitudinal axis C.

With respect to FIGS. 9-11, the actuator 204 includes a distal end 250, a proximal end 254, a first surface 258 (e.g., an actuating surface) that has ribs 262 and extends between the distal and proximal ends 250, 254, and a second surface 266 that is positioned at the proximal end 258. In other or additional embodiments, the first surface 258 may not include ribs. The distal end 250 of the actuator 204 is positioned adjacent the first end 152 of the housing and the proximal end 254 of the actuator 204 is spaced apart from the first end 152 of the housing 150. As shown, the distal end 250 of the actuator 204 is higher than (e.g., positioned above) the proximal end 254 of the actuator 204, and therefore the first surface 258 has a gradually decreasing slope from the distal end 250 to the proximal ends 254. Moreover, the first surface 258 is not parallel with the longitudinal axis C of the actuator 204. The first surface 258 is also positioned at an obtuse angle relative to the second surface 266 are positioned. That is, the first surface 258 slopes inwardly and downwardly relative to the housing 150 of the battery pack 14. Moreover, the first and second surfaces 258, 266 intersect one another and are oriented at an angle ranging from 98 degrees to 102 degrees relative to one another. In the illustrated embodiment, the first and second surfaces 258, 266 are oriented at an angle of approximately 100 degrees relative to on one another. Additionally, the first surface 258 is oriented at an angle that ranges from 50 degrees to 70 degrees relative to the longitudinal axis C, and the second surface 266 is oriented at an angle that ranges from 78 degrees to 82 degrees relative to the longitudinal axis C. In the illustrated embodiment, the first surface 258 is oriented at angle of approximately 60 degrees relative to the longitudinal axis C and the second surface 266 is oriented at an angle of approximately 80 degrees relative to the longitudinal axis C.

The latch mechanism 200 is movable between a latched position (shown herein) and a release position. In the latched position, the latch member 212 extends through the aperture 216 in the top surface 158 and from the top surface 158. In the release position, the latch member 212 is positioned within the housing 150. One or more biasing mechanisms 300 (i.e., springs) bias the latch mechanism 200 in the latched position. The button portion 204 is depressible (e.g., in a direction away from the top surface or a downward direction) to overcome the bias of the springs 300 and move the latch mechanism 200 from the latched position to the release position. The slope of the first surface 258 makes it easier for the user to overcome the bias of the spring 300 and depress the actuator 204.

To attach the battery pack 14 to the power tool 10, the rails 166 of the battery pack 14 are inserted into and slide along the respective first and second channels 82, 90 of the battery receiving portion 64. As the battery pack 14 advances, the surface 86 of the battery pack receiving portion 64 forces the latch member 212 against the bias of the spring 300 and into the housing 150 (e.g., into the release position). When the latch member 212 becomes aligned with the recess 94 in the surface 86 of the power tool 10, the bias of the spring 300 forces the latch member 212 into the latched position and into the recess 94 of the battery receiving cavity 64. In particular, the first latch portion 220 of the latch member 212 is received within the first recess portion 98 of the recess 94 and the second latch portion 224 of the latch member 212 is received in the second recess portion 102 of the recess 86. When the battery pack 14 is attached to the power tool 10, the projections 182 are received in (i.e., keyed in) the first and second recesses 114, 116 of the battery receiving cavity 64. Also, the terminals 120 of the power tool 10 are electrically coupled to the electrical terminals 194 of the battery pack 14.

To remove the battery pack 14 from the power tool 10, the button portion 204 of the latch mechanism 200 is depressed by the user by exerting a force on the first surface 258 of the actuator 204 to overcome the bias of the spring 300 and thereby to retract the latch member 212 into the release position and out of the recess 94 in the power tool 10. In particular, the user exerts a downward force (e.g., in a direction opposite the top surface 158 of the housing 150) on the first surface 258 of the actuator 204. Accordingly, the battery pack 14 can slide out of the battery pack receiving portion 64 by sliding the rails 166 of the battery pack 140 along the channels 82, 90 of the battery receiving cavity 64.

Preferably, the battery pack further includes a second surface that is positioned at the proximal end. The actuating surface and the second surface may intersect one another. The actuating surface may be positioned at an obtuse angle relative to the second surface is positioned. The second surface may be oriented at an angle that ranges from 78 degrees to 82 degrees relative to the longitudinal axis. The actuating surface and the second surface are oriented at an angle ranging from 98 degrees to 102 degrees relative to one another. Preferably, the battery pack further includes a biasing mechanism positioned adjacent to the actuator, the biasing mechanism biases the latch member into a latch position in which the latch member extends from the housing. Depressing the actuator may overcome the bias of the biasing mechanism to move the latch member from the latch position to a release position in which the latch member is positioned within the housing. The distal end of the actuator may be positioned above the proximal end of the actuator. The actuating surface may have ribs. The actuating surface may not be parallel to the longitudinal axis of the housing. The actuating surface may be oriented at an angle that ranges from 50 degrees to 70 degrees relative to the longitudinal axis.

Preferably, the power tool further includes a second surface that is positioned at the proximal end. The actuating surface and the second surface may intersect one another. The actuating surface may be positioned at an obtuse angle relative to the second surface is positioned. The second surface may be oriented at an angle that ranges from 78 degrees to 82 degrees relative to the longitudinal axis. The actuating surface and the second surface may be oriented at an angle ranging from 98 degrees to 102 degrees relative to one another. The distal end of the actuator may be positioned above the proximal end of the actuator. The actuating surface may include ribs. The actuating surface may not be parallel to the longitudinal axis of the battery receiving portion or the longitudinal axis of the housing of the battery pack. The actuating surface may be oriented at an angle that ranges from 50 degrees to 70 degrees relative to the longitudinal axis. The latch mechanism may be movable between a latch position in which the latch member extends from the housing and a release position in which the latch member is positioned within the housing. The actuator may be actuatable to move the latch member from the latch position to the release position. The latch member may be retained in the latch position by a biasing mechanism.

Preferably, the latch mechanism is movable between a latch position in which the latch member extends from the housing and a release position in which the latch member is positioned within the housing. The latch mechanism may include an actuator that is actuatable to move the latch member from the latch position to the release position. The latch member may be retained in the latch position by a biasing mechanism. The actuator may include a distal end that is positioned adjacent a first end of the housing and a proximal end that is spaced apart from the distal end, the distal end being positioned above the proximal end, the actuating surface extending between the distal end and the proximal end. The battery pack may further include a second surface positioned at the proximal end. The actuating surface and the second surface may intersect one another. The actuating surface may be positioned at an obtuse angle relative to the second surface is positioned. The second surface may be oriented at an angle that ranges from 78 degrees to 82 degrees relative to the longitudinal axis. The actuating surface and the second surface may be oriented at an angle ranging from 98 degrees to 102 degrees relative to one another. The actuating surface may have a slope that decreases from the distal end to the proximal end. The actuating surface may not be parallel to the longitudinal axis of the housing. The actuating surface may be oriented at an angle that ranges from 50 degrees to 70 degrees relative to the longitudinal axis.

Thus, the invention provides, among other things, a latch mechanism for a battery pack.

What is claimed is:
1. A battery pack comprising:
a housing having a first end, a second end, and a longitudinal axis that extends between the first end and the second end;
electrical terminals positioned within the housing and configured to engage and electrically couple with electrical terminals of a power tool; and
a latch mechanism including an actuator and a latch member that is spaced apart from the actuator, the actuator having a distal end that is positioned adjacent the first end of the housing, a proximal end that is spaced apart from the distal end, and an actuating surface that extends between the distal end and the proximal end, the actuating surface having a gradually decreasing slope between the distal end and the proximal end;

wherein the latch member extends from the housing in a latch position and further includes a first latch portion including a first inclined surface and a second latch portion including a second inclined surface, wherein the first inclined surface is wider than the second inclined surface, and wherein the first inclined surface has a length that is longer than the second inclined surface;

wherein the first inclined surface and the second inclined surface extend from the housing in the latched position.

2. The battery pack of claim 1, wherein the biasing mechanism biases the latch member into the latch position.

3. The battery pack of claim 2, wherein depressing the actuator overcomes the bias of the biasing mechanism to move the latch member from the latch position to a release position in which the latch member is positioned within the housing.

4. The battery pack of claim 1, wherein the distal end of the actuator is positioned above the proximal end of the actuator.

5. The battery pack of claim 1, wherein the actuating surface has ribs.

6. The battery pack of claim 1, wherein the actuating surface is not parallel to the longitudinal axis of the housing.

7. A power tool comprising:
a housing having a handle configured to be grasped by a user and a battery receiving portion having electrical terminals, the battery receiving portion having a longitudinal axis;
a motor supporting by the housing;
a tool element coupled to the motor;
a battery pack coupleable to the battery receiving portion of the housing of the power tool, the battery pack including
a housing having a first end, a second end, and a longitudinal axis that extends between the first end and the second end;
electrical terminals positioned within the housing and configured to engage and electrically couple with electrical terminals of a power tool; and
a latch mechanism including an actuator and a latch member that is spaced apart from the actuator and receivable within a recess in the battery receiving portion, the actuator having a distal end that is positioned adjacent the first end of the housing, a proximal end that is spaced apart from the distal end, and an actuating surface having a gradually decreasing slope between the distal end and the proximal end;
wherein the latch member extends from the housing in a latch position and further includes a first latch portion having a first inclined surface and a second latch portion including a second inclined surface, wherein the first inclined surface is wider than the second inclined surface, and wherein the first inclined surface has a length that is longer than the second inclined surface;
wherein the first inclined surface and the second inclined surface extend from the housing in the latched position.

8. The power tool of claim 7, wherein the distal end of the actuator is positioned above the proximal end of the actuator.

9. The power tool of claim 7, wherein the actuating surface includes ribs.

10. The power tool of claim 7, wherein the actuating surface is not parallel to the longitudinal axis of the battery receiving portion or the longitudinal axis of the housing of the battery pack.

11. The power tool of claim 7, wherein the latch mechanism is movable between the latch position and a release position in which the latch member is positioned within the housing.

12. The power tool of claim 11, wherein the actuator is actuatable to move the latch member from the latch position to the release position.

13. The power tool of claim 12, wherein the latch member is retained in the latch position by the biasing mechanism.

14. A battery pack comprising:
a housing having a longitudinal axis, a first surface, and a second surface;
electrical terminals positioned within the housing and configured to engage and electrically couple with electrical terminals of a power tool; and
a latch mechanism including an actuator that is movable within an aperture in the first surface and a latch member that extends from the housing in a latch position and is movable within an aperture in the second surface, the actuator including an actuating surface that slopes inwardly and downwardly relative to the housing of the battery pack and a stop surface that extends away from the actuating surface,
wherein the actuating surface lies along a first plane and the stop surface lies along a second plane that is oriented at an obtuse angle relative to the first plane; and
wherein the latch member further includes a first latch portion including a first inclined surface and a second latch portion including a second inclined surface, wherein the first inclined surface is wider than the second inclined surface, and wherein the first inclined surface has a length that is longer than the second inclined surface;
wherein the first inclined surface and the second inclined surface extend from the housing in the latched position.

15. The battery pack of claim 14, wherein the latch mechanism is movable between the latch position and a release position in which the latch member is positioned within the housing.

16. The battery pack of claim 14, wherein the actuator is actuatable to move the latch member from the latch position to the release position.

17. The battery pack of claim 14, wherein the latch member is retained in the latch position by a biasing mechanism.

18. The battery pack of claim 14, wherein the actuator includes a distal end that is positioned adjacent a first end of the housing and a proximal end that is spaced apart from the distal end, the distal end being positioned above the proximal end, the actuating surface extending between the distal end and the proximal end.

19. The battery pack of claim 18, wherein the actuating surface has a slope that decreases from the distal end to the proximal end.

20. The battery pack of claim 14, wherein the actuating surface is not parallel to the longitudinal axis of the housing.

* * * * *